(12) United States Patent
Saito (10) Patent No.: US 10,427,299 B2
(45) Date of Patent: Oct. 1, 2019

(54) DEVICE FOR ROBOT, ROBOT CONTROL DEVICE, AND ROBOT SYSTEM

(71) Applicant: Seiko Epson Corporation, Tokyo (JP)

(72) Inventor: Hidetoshi Saito, Fujimi (JP)

(73) Assignee: Seiko Epson Corporation (JP)

( * ) Notice: Subject to any disclaimer, the term of this patent is extended or adjusted under 35 U.S.C. 154(b) by 129 days.

(21) Appl. No.: 15/497,860

(22) Filed: Apr. 26, 2017

(65) Prior Publication Data

US 2017/0312919 A1 Nov. 2, 2017

(30) Foreign Application Priority Data

Apr. 28, 2016 (JP) .................................. 2016-091487

(51) Int. Cl.
*G05B 19/18* (2006.01)
*G06F 19/00* (2018.01)
*B25J 9/16* (2006.01)
*B25J 13/08* (2006.01)
*G06F 11/14* (2006.01)
*G06F 13/42* (2006.01)

(52) U.S. Cl.
CPC ............ *B25J 9/163* (2013.01); *B25J 13/085* (2013.01); *G06F 11/1438* (2013.01); *G06F 13/4282* (2013.01); *G06F 2201/805* (2013.01)

(58) Field of Classification Search
None
See application file for complete search history.

(56) References Cited

U.S. PATENT DOCUMENTS

| 3,047,167 A | * | 7/1962 | Rose ........................ B25J 5/005 414/728 |
| 4,260,940 A | * | 4/1981 | Engelberger .......... B23P 21/002 318/562 |
| 5,270,699 A | * | 12/1993 | Signaigo .................. H04M 3/22 340/2.9 |
| 5,452,419 A | * | 9/1995 | Di Giulio ............ G05B 19/414 700/56 |
| 5,499,374 A | * | 3/1996 | Di Giulio ............. G06F 13/372 710/107 |
| 6,236,553 B1 | * | 5/2001 | Widell ................. H01H 47/005 307/326 |
| 6,472,838 B1 | * | 10/2002 | Shikazono ............. B25J 9/1602 318/560 |
| 6,629,257 B1 | * | 9/2003 | Hartwell ................... G06F 1/24 713/500 |
| 6,734,581 B1 | * | 5/2004 | Griffis .................... G05B 19/00 192/129 R |

(Continued)

FOREIGN PATENT DOCUMENTS

JP 05-282224 A 10/1993

*Primary Examiner* — Bhavesh V Amin
(74) *Attorney, Agent, or Firm* — Harness, Dickey & Pierce, P.L.C.

(57) ABSTRACT

A device for a robot is disclosed. In the device for a robot, a first signal is transmitted from a robot control device to the robot, a second signal is transmitted from the robot control device to the device for a robot, and a third signal is transmitted from the robot control device to the device for a robot, the third signal being transmitted from the robot control device in a case where there is a communication error between the robot control device and the device for a robot so that the device for a robot is restarted via a reset circuit.

19 Claims, 5 Drawing Sheets

(56) References Cited

U.S. PATENT DOCUMENTS

| | | | | |
|---|---|---|---|---|
| 2001/0034813 | A1* | 10/2001 | Basham | G06F 3/0617 |
| | | | | 711/112 |
| 2002/0068994 | A1* | 6/2002 | Hong | G05B 19/4155 |
| | | | | 700/245 |
| 2002/0072826 | A1* | 6/2002 | Watanabe | G05B 19/409 |
| | | | | 700/264 |
| 2006/0036914 | A1* | 2/2006 | Neumiller | H04L 1/22 |
| | | | | 714/55 |
| 2007/0018823 | A1* | 1/2007 | Kurokawa | G06K 19/0705 |
| | | | | 340/572.1 |
| 2009/0227412 | A1* | 9/2009 | Chang | B25J 9/102 |
| | | | | 475/150 |
| 2011/0153082 | A1* | 6/2011 | Franck | G01B 11/026 |
| | | | | 700/259 |
| 2015/0042256 | A1* | 2/2015 | Kawasaki | H02P 5/00 |
| | | | | 318/568.16 |
| 2017/0057085 | A1* | 3/2017 | Cookson | B25J 9/08 |
| 2017/0312919 | A1* | 11/2017 | Saito | B25J 9/163 |

\* cited by examiner

DEVICE FOR ROBOT, ROBOT CONTROL DEVICE, AND ROBOT SYSTEM

BACKGROUND

1. Technical Field

The present invention relates to a device for a robot, a robot control device, and a robot system.

2. Related Art

Research and development for a technique of detecting a force or torque which is applied to a robot are in progress. For example, when a robot including a force sensor and a robot control device that controls the robot communicate with each other, the robot control device obtains information on both of a force and torque which are applied to the robot.

Regarding communication between devices such as communication between the robot control device and the robot, there is a known technique in which a reset is performed using controlware on the basis of whether a processor in a communication device can be re-operated or not when an error occurs in the communication device (refer to JP-A-05-282224).

However, regarding communication between the robot control device and a force sensor included in the robot, even when the robot control device transmits various commands including a command for restarting the force sensor to the force sensor, a problem that it is not possible to cause the force sensor to perform a desired operation by using the command may occur in the force sensor. In the above-described technique, a user needs to stop the operation of the robot and to perform an operation to restart the force sensor in such a case. Therefore, there is a possibility of a decrease in efficiency of an operation performed by the robot.

SUMMARY

An aspect of the invention is directed to a device for a robot in which a first signal is transmitted from a robot control device to the robot, a second signal is transmitted from the robot control device to the device for a robot, and a third signal is transmitted from the robot control device to the device for a robot, the third signal being transmitted from the robot control device in a case where there is a communication error between the robot control device and the device for a robot so that the device for a robot is restarted via a reset circuit.

According to this configuration, the device for a robot is restarted via the reset circuit on the basis of the third signal transmitted from the robot control device. Therefore, it is possible to restart the device for a robot by using the third signal even in a case where a problem that an operation corresponding to the second signal cannot be performed occurs.

In another aspect of the invention, the device for a robot may be configured such that the second signal is a signal other than a command signal for restarting the device for a robot, which is one of command signals to the device for a robot.

According to this configuration, the device for a robot is restarted via the reset circuit on the basis of the third signal which is different from a signal other than the command signal for restarting the device for a robot, which is one of the command signals to the device for a robot. Therefore, it is possible to restart the device for a robot by using the third signal even in a case where a problem that an operation corresponding to the command signal other than the command signal for restarting the device for a robot cannot be performed occurs.

In another aspect of the invention, the device for a robot may be configured such that the device for a robot is restarted via the reset circuit when receiving the third signal which is a low-level signal continuing for a first period.

According to this configuration, the device for a robot is restarted via the reset circuit when receiving the third signal which is a low-level signal continuing for the first period. Therefore, it is possible to restart the device for a robot by using the third signal which is a low-level signal continuing for the first period and is transmitted from the robot control device even in a case where a problem that an operation corresponding to the second signal cannot be performed occurs.

In another aspect of the invention, the device for a robot may be configured such that the first period is a period having a 9×n-bit length (where n is a real number greater than 1).

According to this configuration, the device for a robot is restarted via the reset circuit when receiving the third signal which is a low-level signal continuing for a period having a 9×n-bit length (where n is a real number greater than 1). Therefore, it is possible to restart the device for a robot by using the third signal which is a low-level signal continuing for a period having a 9×n-bit length (where n is a real number greater than 1) even in a case where a problem that an operation corresponding to the second signal cannot be performed occurs.

In another aspect of the invention, the device for a robot may be configured such that the robot control device transmits the third signal which is a low-level signal continuing for a period having a 9×n-bit length at a transmission speed of 1/n (where n is a real number greater than 1).

According to this configuration, the device for a robot is restarted via the reset circuit when receiving the third signal which is a low-level signal continuing for a period having a 9×n-bit length and is transmitted from the robot control device at a transmission speed of 1/n (where n is a real number greater than 1). Therefore, it is possible to restart the device for a robot by using the third signal which is a low-level signal continuing for a period having a 9×n-bit length and is transmitted from the robot control device at a transmission speed of 1/n (where n is a real number greater than 1) even in a case where a problem that an operation corresponding to the second signal cannot be performed occurs.

In another aspect of the invention, the device for a robot may be configured such that the robot control device and the device for a robot communicate with each other through serial communication.

According to this configuration, the device for a robot is restarted via the reset circuit on the basis of the third signal which is transmitted from the robot control device through the serial communication. Therefore, the device for a robot can receive the third signal, which is transmitted from the robot control device through the serial communication as with the second signal, via the reset circuit even in a case where a problem that an operation corresponding to the second signal cannot be performed occurs.

In another aspect of the invention, the device for a robot may be configured such that the robot control device and the device for a robot are connected to each other via any of RS-422, RS-232C, and RS-485.

According to this configuration, the device for a robot is restarted via the reset circuit on the basis of the third signal which is transmitted from the robot control device connected to the device for a robot via any of RS-422, RS-232C, and RS-485 through the serial communication. Therefore, the device for a robot can receive the third signal, which is transmitted from the robot control device connected to the device for a robot via any of RS-422, RS-232C, and RS-485 through the serial communication as with the second signal, via the reset circuit even in a case where a problem that an operation corresponding to the second signal cannot be performed occurs.

In another aspect of the invention, the device for a robot may be configured such that the robot control device consecutively transmits the second signal to the device for a robot a predetermined number of times and the robot control device transmits the third signal when receiving no response signal with respect to the second signal.

According to this configuration, the device for a robot is restarted via the reset circuit on the basis of the third signal which the robot control device transmits to the device for a robot when receiving no response signal with respect to the second signal after consecutively transmitting the second signal to the device for a robot the predetermined number of times. Therefore, it is possible to restart the device for a robot by using the third signal which is transmitted from the robot control device which transmits the third signal when receiving no response signal with respect to the second signal after consecutively transmitting the second signal to the device for a robot the predetermined number of times.

In another aspect of the invention, the device for a robot may be configured such that the device for a robot is a force sensor.

According to this configuration, the force sensor is restarted via the reset circuit on the basis of the third signal which is transmitted from the robot control device. Therefore, it is possible to restart the force sensor by using the third signal even in a case where a problem that an operation corresponding to the second signal cannot be performed occurs.

Still another aspect of the invention is directed to a robot control device which controls the robot provided with the device for a robot described above.

According to this configuration, the robot control device transmits the third signal for restarting the device for a robot via the reset circuit to the device for a robot. Therefore, the robot control device can restart the device for a robot by transmitting the third signal to the device for a robot which is in a state where a problem that an operation corresponding to the second signal cannot be performed has occurred.

Yet another aspect of the invention is directed to a robot system including the robot provided with the device for the robot described above and a robot control device that controls the robot.

According to this configuration, in the robot system, the device for a robot is restarted via the reset circuit on the basis of the third signal which is transmitted from the robot control device and the robot control device transmits the third signal for restarting the device for a robot via the reset circuit to the device for a robot. Therefore, the robot system can restart the device for a robot by using the third signal even in a case where the device for a robot has a problem that an operation corresponding to the second signal cannot be performed.

According to the above description, the device for a robot is restarted via the reset circuit on the basis of the third signal which is transmitted from the robot control device. Therefore, it is possible to restart the device for a robot by using the third signal even in a case where a problem that an operation corresponding to the second signal cannot be performed occurs.

In addition, the robot control device transmits the third signal for restarting the device for a robot via the reset circuit to the device for a robot. Therefore, the robot control device can restart the device for a robot by transmitting the third signal to the device for a robot which is in a state where a problem that an operation corresponding to the second signal cannot be performed occurs.

In addition, in the robot system, the device for a robot is restarted via the reset circuit on the basis of the third signal which is transmitted from the robot control device and the robot control device transmits the third signal for restarting the device for a robot via the reset circuit to the device for a robot. Therefore, the robot system can restart the device for a robot by using the third signal even in a case where the device for a robot has a problem that an operation corresponding to the second signal cannot be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Hereinafter, an embodiment of the invention will be described with reference to the drawings.

Configuration of Robot System

First, a configuration of a robot system 1 will be described.

Figure 1:
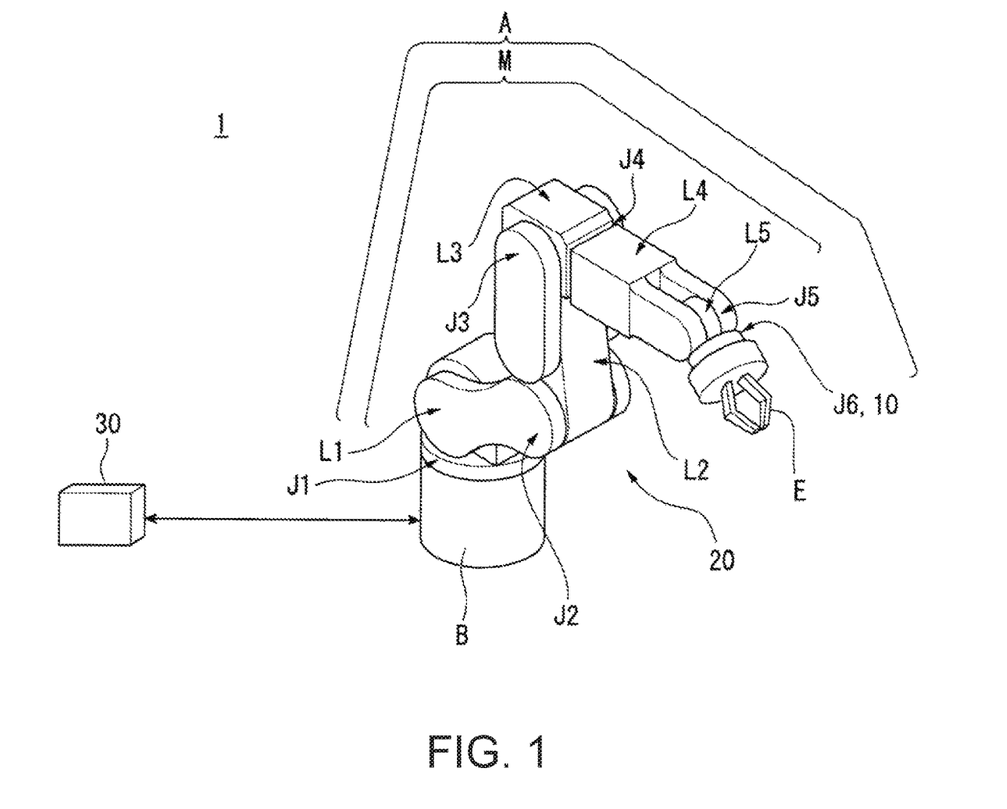
FIG. 1 is a view illustrating an example of a configuration of a robot system according to an embodiment.

FIG. 1 is a view illustrating an example of a configuration of the robot system 1 according to the embodiment. The robot system 1 includes a robot 20 and a robot control device 30.

The robot 20 is a single-arm robot that includes an armA and a support table B supporting the arm A. The single-arm robot is a robot including one arm like the armA in this example. Note that, the robot 20 may be a multiple-arm robot instead of the single-arm robot. The multiple-arm robot is a robot including two or more arms (for example, two or more arms A). The multiple-arm robot that includes two arms is also referred to as a two-arm robot. That is, the robot 20 may be the two-arm robot including two arms and may be a multiple-arm robot including three or more arms (for example, three or more arms A). In addition, the robot 20 may be another type of robot such as a SCARA robot and a cartesian coordinates robot. The cartesian coordinates robot is, for example, a gantry robot.

The arm A includes an end effector E, a manipulator M, and a force detecting unit 10.

In this example, the end effector E is an end effector including finger portions that can grip an object. Note that, instead of the end effector including the finger portions, the end effector E may be an end effector that can lift up an object via air suction, a magnetic force, a jig or the like and may be another type of end effector.

The manipulator M includes five links L1 to L5 which are arm members and six joints J1 to J6 which are joints. The support table B and the link L1 are connected to each other via the joint J1. The link L1 and the link L2 are connected to each other via the joint J2. The link L2 and the link L3 are connected to each other via the joint J3. The link L3 and the link L4 are connected to each other via the joint J4. The link L4 and the link L5 are connected to each other via the joint J5. The link L5 and the end effector E are connected to each other via the joint J6. That is, the arm A including the manipulator M is a six-axis vertical articulated arm. Note that, the arm A may be configured to operate with the degree of freedom of 5 axes or less and may be configured to operate with the degree of freedom of 7 axes or more.

Each of the joint J2, the joint J3, and the joint J5 is a bending joint and each of the joint J1, the joint J4, and the joint J6 is a torsional joint. As described above, the end effector E is connected to (attached to) the joint J6.

The end effector E and the six joints included by the manipulator M are connected to the robot control device 30 via a cable such that the end effector E and the six joints can communicate with the robot control device 30. Note that, wired communication via the cable is based on a standard such as Ethernet (registered trademark) and USB (Universal Serial Bus), for example. In addition, the end effector E may be configured to be connected to the robot control device 30 via wireless communication which is based on a communication standard such as Wi-Fi (registered trademark). In addition, a portion or all of the six joints included by the manipulator M may be configured to be connected to the robot control device 30 via wireless communication which is based on a communication standard such as Wi-Fi (registered trademark).

The force detecting unit 10 is provided between the end effector E and the manipulator M. The force detecting unit 10 is, for example, a force sensor. The force detecting unit 10 detects an applied external force. The external force refers to at least one of a force and torque (moment). Specifically, the magnitude of a force detected by the force detecting unit 10 is the magnitude of a force applied to the end effector E or an object gripped by the end effector E and is the magnitude of a force applied in each of an X axis direction, a Y axis direction, and a Z axis direction of a force detection coordinate system. In addition, the magnitude of torque detected by the force detecting unit 10 is the magnitude of torque applied to the end effector E or an object gripped by the end effector E and is the magnitude of torque applied in each of a U axis direction, a V axis direction, and a W axis direction of the force detection coordinate system. The force detecting unit 10 outputs force detection information including force detection values that indicate the detected magnitudes to the robot control device 30 through communication. The force detection coordinate system is a three-dimensional local coordinate system which is correlated with the force detecting unit 10 so as to move along with the force detecting unit 10. In addition, the U axis direction is a rotation direction about the X axis. In addition, the V axis direction is a rotation direction about the Y axis. In addition, the W axis direction is a rotation direction about the Z axis.

The force detection information is used for control by the robot control device 30 which is based on the force detection information. The control is, for example, compliant motion control such as impedance control. Note that, the force detecting unit 10 may be another type of sensor (for example, a torque sensor) that detects an external force. In addition, the force detecting unit 10 may be provided for a portion or all of the joints J1 to J6 instead of being provided between the end effector E and the manipulator M and the force detecting unit 10 may be provided for a portion or all of the joints J1 to J6 in addition to being provided between the end effector E and the manipulator M. Furthermore, the force detecting unit 10 may be provided on another portion of the robot 20.

In this example, the robot control device 30 is a robot controller. The robot control device 30 generates a first signal such as a control signal on the basis of an operation program which is input in advance. The robot control device 30 transmits the generated control signal to the robot 20 so that the robot 20 performs a predetermined operation. The predetermined operation is an operation based on the force detection information obtained from the force detecting unit 10. The operation is, for example, an operation in which the robot 20 grips an object (not shown) and the robot 20 disposes the gripped object on a material supply region (not shown) However, the operation may be another operation based on the force detection information instead of the above-described operation.

In addition, the robot control device 30 generates a command signal to be transmitted to the force detecting unit 10 included by the robot 20. The robot control device 30 transmits the generated command signal to the force detecting unit 10 so that the force detecting unit 10 performs an operation corresponding to the command signal. The operation is, for example, an operation of transmitting the force detection information including the force detection values detected by the force detecting unit 10 to the robot control device 30.

Here, in any of the following cases (1) to (3), a communication error between the force detecting unit 10 and the robot control device 30 occurs.

(1) A case where the robot control device 30 transmits a command signal consisting of a predetermined number of bytes to the force detecting unit 10 but the force detecting unit 10 does not recognize that the force detecting unit 10 has received all of the bytes constituting the command signal so that the force detecting unit 10 waits for receiving the remainder bytes.

(2) A case where the force detecting unit 10 receives a command signal consisting of more than the predetermined number of bytes constituting the command signal and the force detecting unit 10 recognizes the excess bytes over the predetermined number of bytes in bytes included in the command signal as the next command signal so that the force detecting unit 10 waits for receiving the remainder bytes.

(3) A case where an error occurs in a processing circuit such as a communication circuit in the force detecting unit 10 due to the influence of noise or a bug so that the force detecting unit 10 cannot be operated even when the robot control device 30 transmits a command signal to the force detecting unit 10.

In a case where a communication error occurs due to above-described (1) and (2), the communication error can be resolved by setting a timeout time for each byte in the command signal transmitted from the robot control device 30. Therefore, in a case where the force detecting unit 10 receives no next bytes until the timeout time elapses, the force detecting unit 10 considers that a timeout has occurred and waits for receiving a new command signal while discarding the bytes received so far.

Meanwhile, in a case where a communication error occurs due to above-described (3), the communication error can be resolved by restarting the force detecting unit 10. However, in a case where a force detecting unit which is different from the force detecting unit 10 is used, to restart the force detecting unit, it is necessary to turn on the power source of the force detecting unit after turning off the power source once and to manually operate a reset switch of the force detecting unit and thus it is necessary to stop the operation of a robot including the force detecting unit each time the force detecting unit is restarted. This is not desirable since the efficiency of an operation performed by the robot is decreased.

Therefore, in a case where a communication error occurs due to above-described (3), the force detecting unit 10 in this example is restarted via a reset circuit on the basis of a third signal which is different from a second signal transmitted from the robot control device 30. Therefore, it is possible for the robot control device 30 to restart the force detecting unit 10 by using the third signal even in a case where a problem that an operation corresponding to the second signal cannot be performed occurs. The second signal is, for example, the above-described command signal. The second signal may be another type of signal instead of the command signal. The third signal is a signal for restarting the force detecting unit 10.

Hereinafter, a process in which the robot control device 30 restarts the force detecting unit 10 using the third signal will be described in detail.

The force detecting unit 10 is an example of a device for a robot. Note that, the process also can be applied to another type of device for a robot such as an angular velocity sensor instead of the force detecting unit 10.

Hardware Configurations of Force Detecting Unit and Robot Control Device

Figure 2:
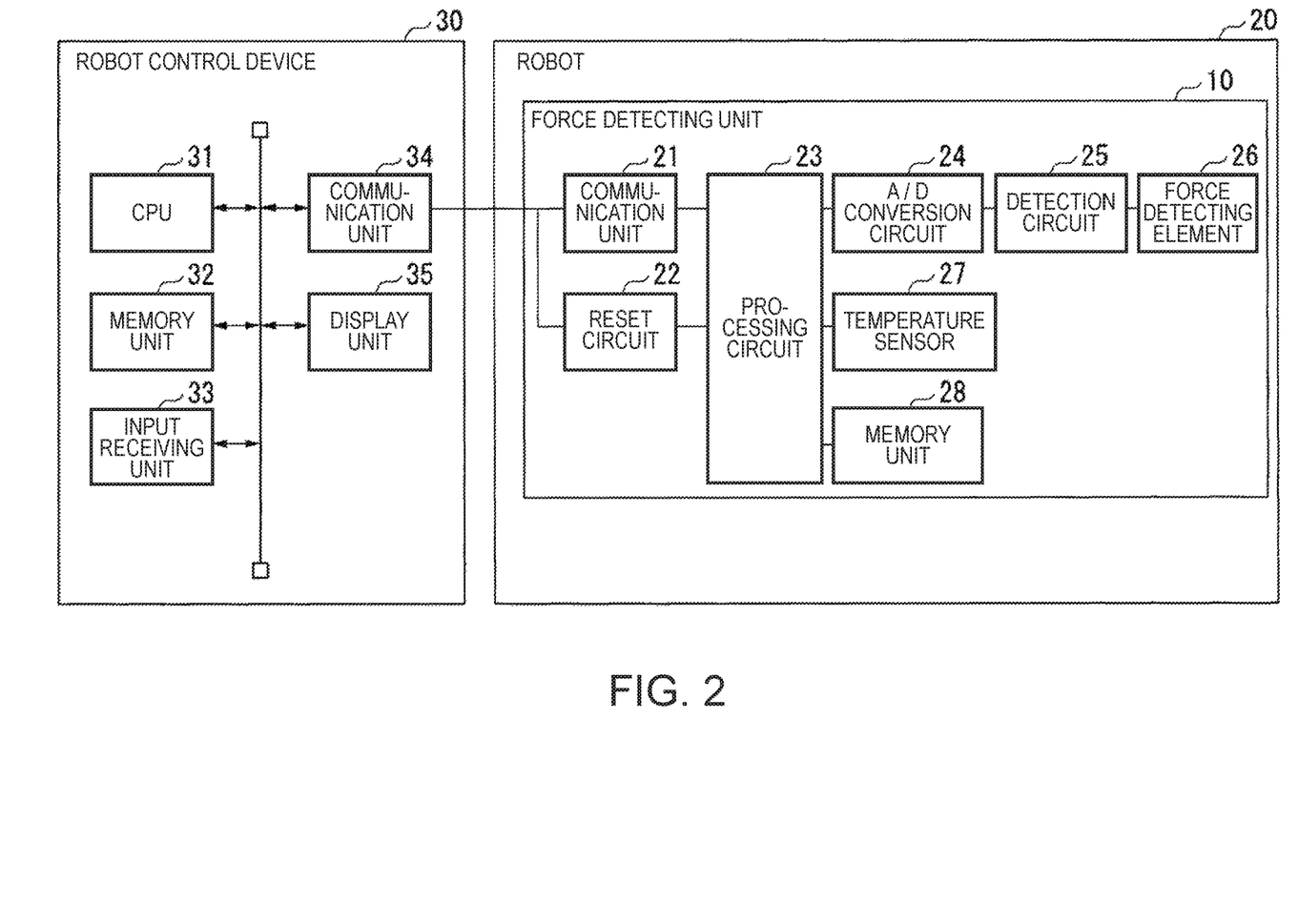
FIG. 2 is a diagram illustrating an example of a hardware configuration of the robot system according to the embodiment.

FIG. 2 is a diagram illustrating hardware configurations of the force detecting unit 10 and the robot control device 30.

First, the hardware configuration of the force detecting unit 10 will be described. The force detecting unit 10 includes a communication unit 21, a reset circuit 22, a processing circuit 23, an analog-to-digital (A/D) conversion circuit 24, a detection circuit 25, a force detecting element 26, a temperature sensor 27, and a memory unit 28. The above-described constituent elements are connected to each other so that the above-described constituent elements can communicate with each other. The force detecting unit 10 communicates with the robot control device 30 via the communication unit 21 or the reset circuit 22.

The communication unit 21 is constituted by a connector which is based on a serial communication standard such as RS-422, RS-232C, and RS-485.

The reset circuit 22 is configured to include, for example, a connector which is based on a serial communication standard such as RS-422, RS-232C, and RS-485, a microcomputer, or the like and resets the processing circuit 23.

The processing circuit 23 is configured to include, for example, a field-programmable gate array (FPGA) or the like and executes various programs stored in the memory unit 28.

The A/D conversion circuit 24 converts an analog signal supplied from the detection circuit 25 into a digital signal.

The detection circuit 25 is configured to, for example, include an analog circuit or the like and detects the amount of electric charge output from the force detecting element 26.

The force detecting element 26 is configured to include a plurality of piezoelectric substances such as crystals as force detecting elements and outputs an electric charge corresponding to a shearing force applied to the crystals.

The temperature sensor 27 is configured to include, for example, a temperature sensor integrated circuit (IC) and detects the temperature of the processing circuit 23.

The memory unit 28 includes, for example, a solid state drive (SSD), an electrically erasable programmable read-only memory (EEPROM), a read-only memory (ROM), a random access memory (RAM), or the like. The memory unit 28 may be an external memory device which is connected via a digital input and output port such as a USB or the like instead of a memory device which is built into the force detecting unit 10.

Next, the hardware configuration of the robot control device 30 will be described. The robot control device 30 includes, for example, a central processing unit (CPU) 31, a memory unit 32, an input receiving unit 33, a communication unit 34, and a display unit 35. The above-described constituent elements are connected to each other so that the above-described constituent elements can communicate with each other via a bus. In addition, the robot control device 30 communicates with each of the robot 20 and the force detecting unit 10 via the communication unit 34.

The CPU 31 executes various programs stored in the memory unit 32.

The memory unit 32 includes, for example, a hard disk drive (HDD), an SSD, an EEPROM, a ROM, a RAM, or the like. The memory unit 32 may be an external memory device which is connected via a digital input and output port such as a USB or the like instead of a memory device which is built into the robot control device 30. The memory unit 32 stores various information and programs which the robot control device 30 processes.

The input receiving unit 33 is, for example, a teaching pendant including a keyboard, a mouse, a touch pad, or the like or another type of input device. The input receiving unit 33 may be integrally configured with the display unit 35 as a touch panel.

The communication unit 34 is configured to include, for example, a connector based on a serial communication standard such as RS-422, RS-232C, RS-485 and the like, a digital input and output port such as USB, an Ethernet (registered trademark) port, and the like.

The display unit 35 is, for example, a liquid crystal display panel or an organic electro luminescence (EL) display panel.

Functional Configurations of Force Detecting Unit and Robot Control Device

Figure 3:
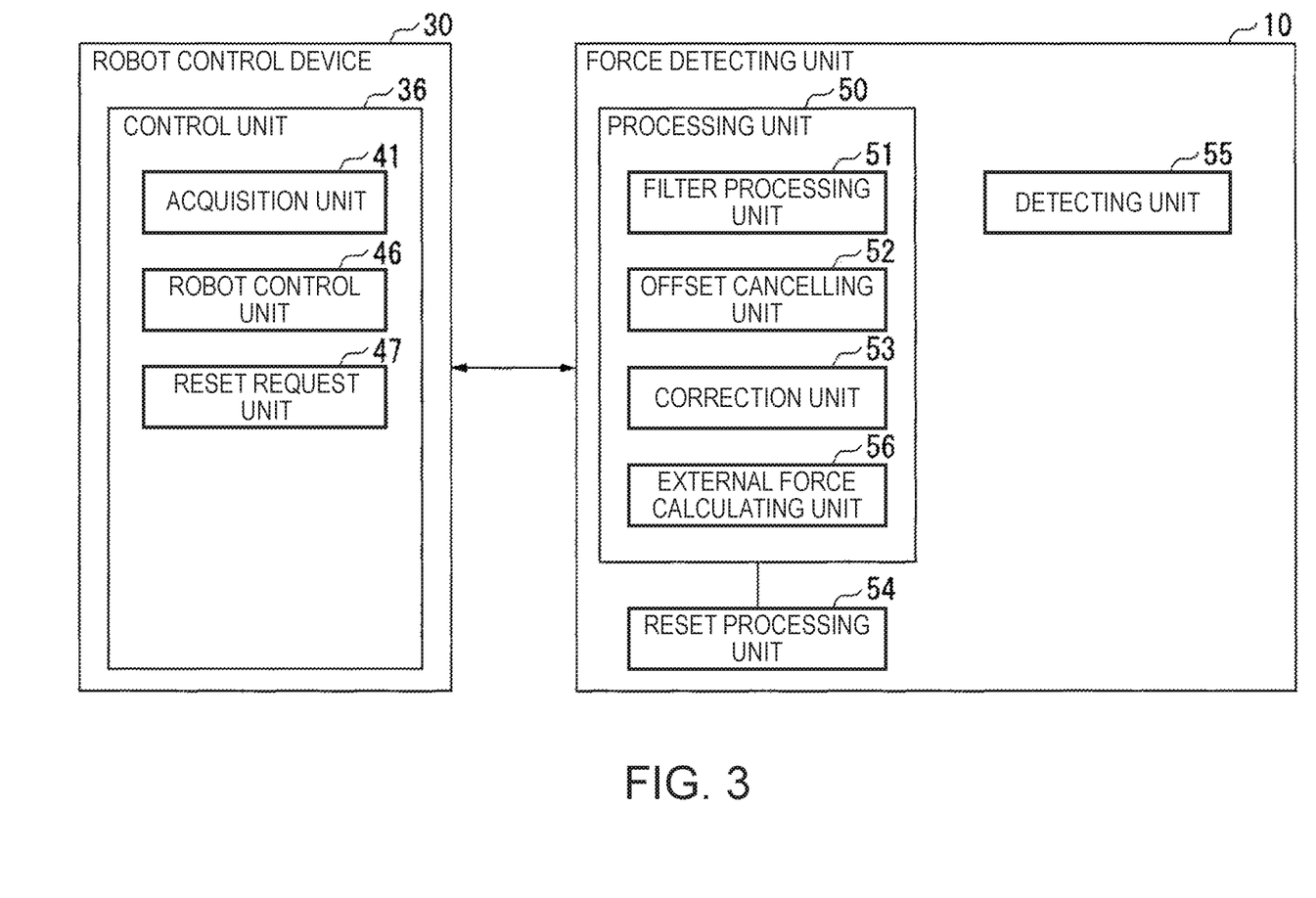
FIG. 3 is a diagram illustrating an example of a functional configuration of the robot system according to the embodiment.

Hereinafter, functional configurations of the force detecting unit 10 and the robot control device 30 will be described with reference to FIG. 3. FIG. 3 is a diagram illustrating an example of the functional configurations of the force detecting unit 10 and the robot control device 30.

First, the functional configuration of the robot control device 30 will be described. The robot control device 30 includes a control unit 36. The control unit 36 controls the entire robot control device 30. The control unit 36 includes an acquisition unit 41, a robot control unit 46, and a reset request unit 47. These functional units of the control unit 36 are realized, for example, when the CPU 31 executes the various programs stored in the memory unit 32. In addition, a portion or all of these functional units may be hardware functional units such as large scale integration (LSI) and an application specific integrated circuit (ASIC).

The acquisition unit 41 transmits a command signal that requests acquisition of the force detection information to the force detecting unit 10. The acquisition unit 41 receives the force detection information as a response to the command signal that requests acquisition of the force detection information. Here, the command signal will be described. Hereinafter, as an example, a case where the force detecting unit 10 and the robot control device 30 are connected to each other via RS-422 will be described.

Figure 4:
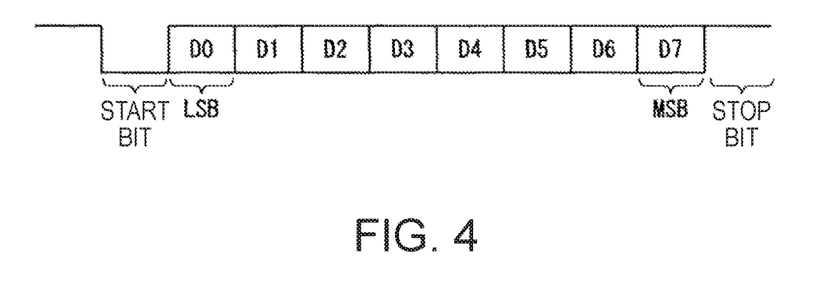
FIG. 4 is a diagram illustrating an example of the format of data transmitted and received between a robot control unit and a robot.

FIG. 4 is a diagram illustrating an example of the format of data which is transmitted and received between the acquisition unit 41 and the force detecting unit 10 according to RS-422. The data transmission and reception between the acquisition unit 41 and the force detecting unit 10 are performed in a so-called little-endian manner in which numeric data having a data amount of 2 bytes or more is split into data pieces of 1 byte and the data pieces are sequentially transmitted in such a manner that the least significant byte is transmitted first. The format of the data includes a start bit, 8-bit data, and a stop bit. In FIG. 4, 8-bit data "D0, D1, D2, D3, D4, D5, D6, D7" is illustrated. "D0" of the data "D0, D1, D2, D3, D4, D5, D6, D7" is the least significant bit (LSB) and "D7" is the most significant bit (MSB).

Figure 5:
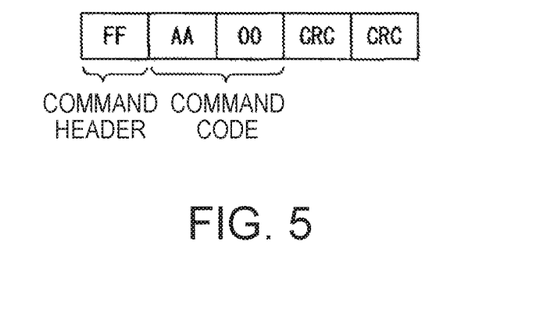
FIG. 5 is a diagram illustrating an example of a command signal transmitted and received between the robot control unit and the robot.

FIG. 5 is a diagram illustrating an example of a command signal which is transmitted to the force detecting unit 10 from the acquisition unit 41. Each of blocks "FF", "AA", "00", "CRC", and "CRC" in FIG. 5 is represented with 8 bits as illustrated in FIG. 4. FIG. 5 illustrates a command header, a command code, and an error detecting code (cyclic redundancy check) which are transmitted to the force detecting unit 10 from the acquisition unit 41. "FF" is an example of the command header. "AA00" is an example of the command code. "CRC" is an example of the error detecting code. In this example, each of the command code and the command header is represented with a hexadecimal number. Note that, the command code may be another command code instead of "AA00".

In addition, for example, in a case where the acquisition unit 41 transmits data "BB11" to the force detecting unit 10, the data includes "BB" and "11" instead of "AA" and "00" illustrated in FIG. 5. In such a case, the acquisition unit 41 transmits "FF", "BB", "11", "CRC", and "CRC" in this order. Then, the acquisition unit 41 transmits data when receiving a positive response (ACK) from the force detecting unit 10 and does not transmit data when receiving a negative response (NACK) from the force detecting unit 10.

In addition, for example, in a case where the acquisition unit 41 transmits data "CC22" to the force detecting unit 10, the data includes "CC" and "22" instead of "AA" and "00" illustrated in FIG. 5. In such a case, the acquisition unit 41 transmits "FF", "CC", "22", "CRC", and "CRC" in this order. Then, the acquisition unit 41 transmits data when receiving a positive response (ACK) from the force detecting unit 10 and does not transmit data when receiving a negative response (NACK) from the force detecting unit 10.

In addition, for example, in a case where the acquisition unit 41 receives data "DD33" from the force detecting unit 10, the data includes "DD" and "33" instead of "AA" and "00" illustrated in FIG. 5. In such a case, the acquisition unit 41 receives "FF", "DD", "33", "CRC", and "CRC" in this order. Then, the acquisition unit 41 continues to receive data when receiving a positive response (ACK) from the force detecting unit 10 and does not receive data when receiving a negative response (NACK) from the force detecting unit 10.

Here, each of "BB11", "CC22", and "DD33" is an example of data and other data may be used.

The following description will be made returning to FIG. 3. The robot control unit 46 causes the robot 20 to perform a predetermined operation. For example, the robot control unit 46 controls the robot 20 by transmitting a control signal to the robot 20. In addition, the robot control unit 46 controls the robot 20 on the basis of the force detection information which is obtained via the acquisition unit 41.

The reset request unit 47 requests the force detecting unit 10 to be reset. For example, the reset request unit 47 requests the force detecting unit 10 to be reset by transmitting a reset signal for resetting the force detecting unit 10 in a case where the acquisition unit 41 consecutively transmits the command signal to the force detecting unit 10 a predetermined number of times and the acquisition unit 41 receives no response signal with respect to the command signal the predetermined number of times consecutively.

In a case where the acquisition unit 41 consecutively transmits the command signal to the force detecting unit 10 the predetermined number of times and the robot control unit 46 receives no response signal with respect to the command signal the predetermined number of times consecutively, there is a high possibility that an error due to an environment such as a noise or a problem due to a design or manufacturing defect of a circuit or software, that is, a communication error due to above-described (3), has occurred in the force detecting unit 10. Therefore, the reset request unit 47 transmits the reset signal to the force detecting unit 10.

The reset signal is a signal different from the command signal and is, for example, a low-level signal continuing for a first period. The command signal is a signal other than a command signal for restarting the force detecting unit 10, which is one of command signals to the force detecting unit 10. The first period is a period longer than a period having a 1-byte (8-bit) length. For example, the first period is a period having a 9×n-bit length (where n is a real number greater than 1). Note that, "9" in "9×n-bit" is merely an example and any number other than 9 may be used as long as the first period becomes a period longer than a period having a 1-byte (8-bit) length. When the reset signal is a low-level signal continuing for a period having a 9×n-bit length (where n is a real number greater than 1), the reset circuit 22 receives the reset signal although the communication error occurs in the communication unit 21 with a stop bit in the first byte not being transmitted thereto. Therefore, the force detecting unit 10 can recognize that the reset signal is a signal different from the command signal for controlling the operation of the force detecting unit 10.

Since the reset signal is transmitted to the force detecting unit 10 from the reset request unit 47 in the little-endian manner, the reset signal is transmitted in a format consisting of a start bit, 8-bit data, and a stop bit. Therefore, when transmitting the reset signal, the reset request unit 47 transmits a low-level signal continuing for a period having an 8-bit length while temporarily setting the transmission speed (baud rate) to 1/n. Accordingly, the reset request unit 47 can transmit a low-level signal continuing for a period having a 9×n-bit length in a pseudo manner.

Figure 6:
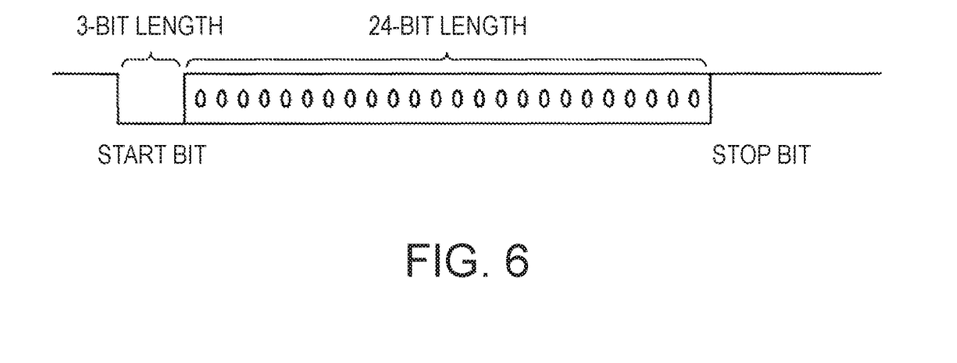
FIG. 6 is a diagram illustrating an example of a reset signal.

FIG. 6 is a diagram illustrating an example of the reset signal. In the example illustrated in FIG. 6, n is 3 and "0" is transmitted for 24 consecutive bits which follow three start bits. That is, "0" is transmitted for 27 consecutive bits in total. Hereinafter, the description of a case where n=3 will be continued.

Next, the functional configuration of the robot 20 will be described.

The force detecting unit 10 included by the robot 20 includes a detecting unit 55, a processing unit 50, and a reset processing unit 54.

The detecting unit 55 is realized by the detection circuit 25. The detecting unit 55 detects the amount of electric charge output from the force detecting element 26 and converts the amount of electric charge into voltage. The detecting unit 55 outputs a signal, which is obtained by converting the amount of electric charge into voltage, to the A/D conversion circuit 24. The A/D conversion circuit 24 converts the obtained signal into a digital signal and outputs the digital signal to the processing circuit 23.

The processing unit 50 is realized by the processing circuit 23. The processing unit 50 includes a filter processing unit 51, an offset cancelling unit 52, a correction unit 53, and an external force calculating unit 56.

The filter processing unit 51 eliminates noises through filter processing of the digital signal obtained from the A/D conversion circuit 24 and outputs the digital signal to the offset cancelling unit 52.

The offset cancelling unit 52 eliminates offset voltage from the signal obtained from the filter processing unit 51. The offset cancelling unit 52 outputs the signal from which the offset voltage has been eliminated to the correction unit 53.

The correction unit 53 performs time drift correction with respect to the signal obtained from the offset cancelling unit 52 and performs temperature drift correction on the basis of a temperature detected by the temperature sensor 27. Then, the correction unit 53 outputs the corrected signal to the external force calculating unit 56.

The external force calculating unit 56 calculates the force detection values on the basis of the signal obtained from the correction unit 53. For example, the external force calculating unit 56 calculates a force acting on the end effector E or on an object gripped by the end effector E. The force is a force applied in each of the X axis direction, the Y axis direction, and the Z axis direction of the force detection coordinate system. In addition, the external force calculating unit 56 calculates torque rotating the end effector E or on an object gripped by the end effector E. The torque is torque applied in each of the U axis direction, the V axis direction, and the W axis direction of the force detection coordinate system. The external force calculating unit 56 generates the force detection information including the calculated force detection values and transmits the generated force detection information to the robot control device 30 via the communication unit 21.

The reset processing unit 54 is realized by the reset circuit 22. The reset processing unit 54 resets the processing circuit 23 when receiving the reset signal transmitted by the robot control device 30. For example, in a case where the reset processing unit 54 detects a low-level signal continuing for a period having a 27-bit length, the reset processing unit 54 issues a system reset signal to the entire processing circuit 23 and maintains a system reset state until receiving a high-level signal. According to this configuration, it is possible for the reset processing unit 54 to reset the processing circuit 23. Here, although the communication unit 21 also receives the reset signal, the communication unit 21 performs a normal error fixing process while considering that there is a communication error since a stop bit in the first byte is not transmitted thereto. Therefore, when the reset processing unit 54 receives the reset signal, the subsequent process, that is, a process of resetting the processing circuit 23 is performed.

Process Performed by Robot System

Figure 7:
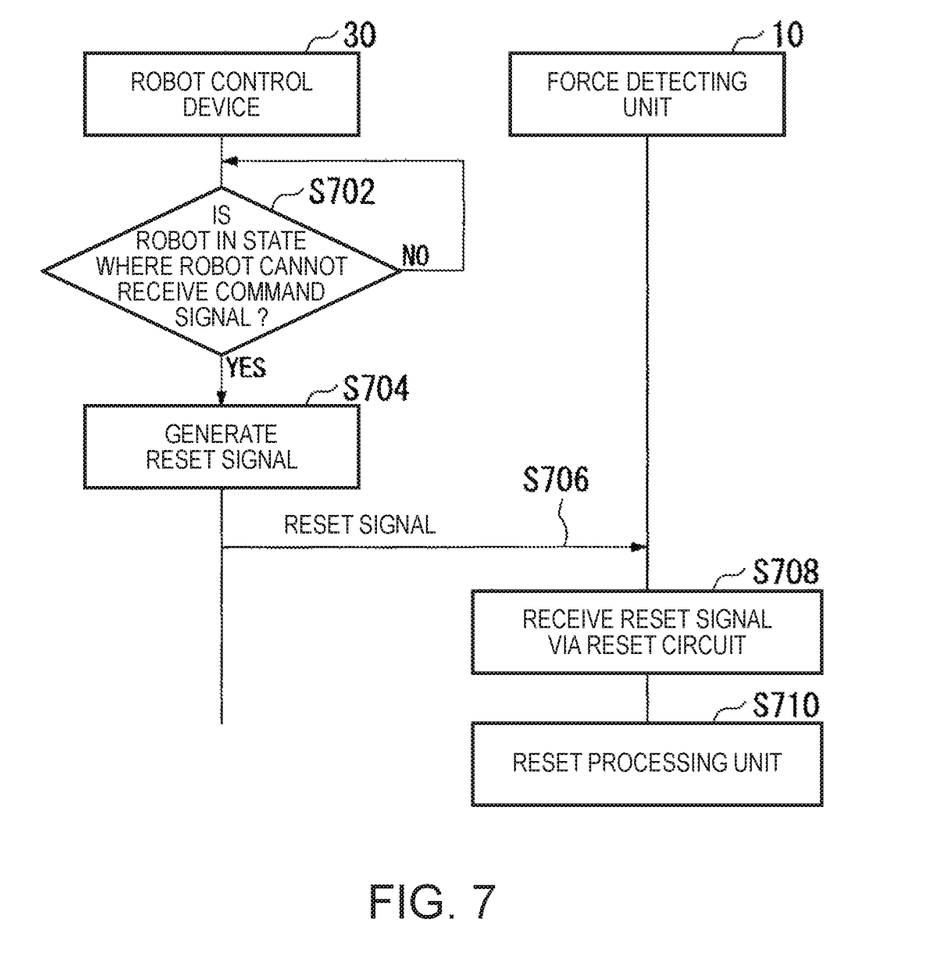
FIG. 7 is a diagram illustrating an example of an operation of the robot system according to the embodiment.

Hereinafter, a process performed by the robot system 1 in this example will be described with reference to FIG. 7. FIG. 7 is a sequence diagram illustrating an example of a process in which the robot control device 30 in the robot system 1 resets the force detecting unit 10.

The robot control device 30 determines whether or not the force detecting unit 10 is in a state where the force detecting unit 10 cannot receive the command signal (Step S702) For example, the reset request unit 47 determines that the force detecting unit 10 is in a state where the force detecting unit 10 cannot receive the command signal in a case where the acquisition unit 41 consecutively transmits the command signal to the force detecting unit 10 a predetermined number of times and the acquisition unit 41 receives no response signal with respect to the command signal the predetermined number of times consecutively.

In a case where it is determined that the force detecting unit 10 is not in a state where the force detecting unit 10 cannot receive the command signal, (Step S702—NO), the reset request unit 47 transitions into Step S702 and determines whether or not the force detecting unit 10 is in a state where the force detecting unit 10 cannot receive the command signal again. Meanwhile, in a case where it is determined that the force detecting unit 10 is in a state where the force detecting unit 10 cannot receive the command signal (Step S702—YES), the reset request unit 47 generates the reset signal (Step S704). For example, the reset request unit 47 generates the reset signal which is a low-level signal continuing for a period having a 9×n-bit length.

Next, the reset request unit 47 transmits the reset signal to the force detecting unit 10 (Step S706). Then, the reset processing unit 54 of the force detecting unit 10 receives the reset signal which is transmitted by the robot control device 30 in Step S706 (Step S708). Next, the reset processing unit 54 resets the processing unit 50 by outputting the system reset signal to the processing unit 50 (Step S710).

After Step S710, the processing unit 50 is reset and thus the force detecting unit 10 operates normally. Note that, a configuration in which the reset processing unit 54 outputs an alarm signal to the robot control device 30 in a case where the processing unit 50 is not reset although the reset processing unit 54 has output the system reset signal to the processing unit 50 may be adopted or not. In a case where the configuration in which the reset processing unit 54 transmits the alarm signal to the robot control device 30 is adopted, the reset request unit 47 of the robot control device 30 informs that an error occurs in the robot 20 via the display unit 35 when receiving the alarm signal transmitted from the reset processing unit 54, for example. Therefore, the robot system 1 can informs a user that a problem that an operation corresponding to the first signal cannot be performed has occurred in the robot 20 and it is necessary to take a measure.

In this example, a configuration in which the force detecting unit 10 converts an electric charge corresponding to a shearing force detected by the force detecting element 26 into a force or torque has been described. However, instead of the above-described configuration, a configuration in which the robot control device 30 converts the electric charge into a force or torque may be adopted. In this case, the force detecting unit 10 outputs information indicating the electric charge to the robot control device 30.

In addition, in this example, a case where the robot system includes one force detecting unit and one robot control device which is connected to the force detecting unit (that is, the case of the robot system 1 illustrated in FIG. 1) has been described. However, instead of the above-described configuration, a configuration in which the robot system includes a plurality of force detecting units and a plurality of robot control devices which are respectively connected to the plurality of force detecting units may be adopted. In this case, the robot control devices are connected to each other via a network such as EtherCAT. In addition, the above-described reset circuit is provided in each of the plurality of force detecting units. The reset signal which is transmitted from each of the plurality of robot control devices is received by each reset circuit via the EtherCAT. When the reset circuit receives a reset signal, the reset circuit outputs a system reset signal to a processing circuit in the force detecting unit corresponding to the robot control device which has transmitted the reset signal. Accordingly, it is possible to restart the force detecting unit corresponding to the robot control device which has transmitted the reset signal.

In addition, in this example, a case where the robot control device resets the force detecting unit has been described. However, the invention also can be applied to a case where a communication device resets another communication device. For example, the invention may be applied to a case where the robot control device 30 resets a control circuit of an actuator included by the manipulator M and may be applied to a case where the robot control device 30 resets a control circuit of another device which performs an operation along with the robot 20.

In addition, in this example, a case where the reset circuit resets the processing circuit using the reset signal has been described. However, instead of this, the reset circuit may reset another circuit such as the detection circuit by using the reset signal.

As described above, the device for a robot in the embodiment (in this example, the force detecting unit 10) can be restarted via the reset circuit (in this example, the reset circuit 22) on the basis of the third signal (in this example, the reset signal) transmitted from the robot control device (in this example, the robot control device 30). Therefore, it is possible to restart the device for a robot by using the third signal even in a case where a problem that an operation corresponding to the second signal (in this example, the command signal) cannot be performed occurs.

In addition, the device for a robot can be restarted via the reset circuit on the basis of the third signal which is different from a signal other than the command signal for restarting the device for a robot, which is one of the command signals to the device for a robot. Therefore, it is possible to restart the device for a robot by using the third signal even in a case where a problem that an operation corresponding to the command signal other than the command signal for restarting the device for a robot cannot be performed occurs.

In addition, the device for a robot can be restarted via the reset circuit when the device for a robot receives the third signal which is a low-level signal continuing for the first period. Therefore, it is possible to restart the device for a robot by using the third signal which is a low-level signal continuing for the first period and is transmitted from the robot control device even in a case where a problem that an operation corresponding to the second signal cannot be performed occurs.

In addition, the device for a robot can be restarted via the reset circuit when the device for a robot receives the third signal which is a low-level signal continuing for a period having a 9×n-bit length (where n is a real number greater than 1). Therefore, it is possible to restart the device for a robot by using the third signal which is a low-level signal continuing for a period having a 9×n-bit length (where n is a real number greater than 1) even in a case where a problem that an operation corresponding to the second signal cannot be performed occurs.

In addition, the device for a robot can be restarted via the reset circuit 22 when the device for a robot receives the third signal which is a low-level signal continuing for a period having a 9×n-bit length and is transmitted from the robot control device at a transmission speed of 1/n (where n is a real number greater than 1). Therefore, it is possible to restart the device for a robot by using the third signal which is a low-level signal continuing for a period having a 9×n-bit length and is transmitted from the robot control device at a transmission speed of 1/n (where n is a real number greater than 1) even in a case where a problem that an operation corresponding to the second signal cannot be performed occurs.

In addition, the device for a robot can be restarted via the reset circuit 22 on the basis of the third signal which is transmitted from the robot control device 30 through the serial communication. Therefore, the device for a robot can receive the third signal, which is transmitted from the robot control device through the serial communication as with the second signal, via the reset circuit even in a case where a problem that an operation corresponding to the second signal cannot be performed occurs.

In addition, the device for a robot can be restarted via the reset circuit 22 on the basis of the third signal which is transmitted from the robot control device 30 connected to the device for a robot via any of RS-422, RS-232C, and RS-485 through the serial communication. Therefore, the device for a robot can receive the third signal, which is transmitted from the robot control device connected to the device for a robot via any of RS-422, RS-232C, and RS-485 through the serial communication as with the second signal, via the reset circuit even in a case where a problem that an operation corresponding to the second signal cannot be performed occurs.

In addition, the device for a robot can be restarted via the reset circuit 22 on the basis of the third signal which the robot control device 30 transmits to the device for a robot when receiving no response signal with respect to the second signal after consecutively transmitting the second signal to the device for a robot the predetermined number of times. Therefore, it is possible to restart the device for a robot by using the third signal which is transmitted from the robot control device which transmits the third signal when receiving no response signal with respect to the second signal after consecutively transmitting the second signal to the device for a robot the predetermined number of times.

In addition, the force sensor (in this example, the force detecting unit 10) can be restarted via the reset circuit 22 on the basis of the third signal which is transmitted from the robot control device 30. Therefore, it is possible to restart the force sensor by using the third signal even in a case where a problem that an operation corresponding to the second signal cannot be performed occurs.

In addition, the robot control device 30 can transmit the third signal for restarting the device for a robot via the reset circuit 22 to the device for a robot. Therefore, the robot control device 30 can restart the device for a robot by transmitting the third signal to the device for a robot which is in a state where a problem that an operation corresponding to the second signal cannot be performed has occurred.

In addition, in the robot system 1, the device for a robot can be restarted via the reset circuit on the basis of the third signal which is transmitted from the robot control device and the robot control device can transmit the third signal for restarting the device for a robot via the reset circuit to the device for a robot. Therefore, the robot system can restart the device for a robot by using the third signal even in a case where the device for a robot has a problem that an operation corresponding to the second signal cannot be performed.

The embodiment of the invention has been described above in detail with reference to the drawings. However, the specific configuration is not limited to this embodiment, and modification, substitution, deletion, and the like may be made without departing from the spirit of the invention.

In addition, a program for realizing the function of an arbitrary constituent unit in the above described device (for example, the force detecting unit 10 and the robot control device 30) may be recorded in a computer-readable recording medium so that a computer system reads and executes the program. The "computer system" here includes an operating system (OS) and a hardware such as peripheral equipment. In addition, the "computer-readable recording medium" refers to a portable medium such as a flexible disk, a magneto-optical disk, a ROM, and a compact disk (CD)-ROM or a memory device such as a hard disk built into a computer system. Furthermore, the "computer-readable recording medium" includes a medium which temporarily holds a program as with a volatile memory (RAM) in a computer system which serves as a server or a client in a case where a program is transmitted via a network such as the Internet or a communication line such as a telephone line.

In addition, the above-described program may be transmitted from a computer system, which includes a memory device or the like storing the above-described program, to another computer system via a transmission medium or a transmission wave in the transmission medium. Here, the "transmission medium" via which the program is transmitted refers to a medium which has a function of transmitting information as with a network (a communication network) such as the Internet or a communication line (a communication wire) such as a telephone line.

In addition, the above-described program may be a program for realizing a portion of the above-described functions. Furthermore, the above-described program may be a program which can realize the above-described functions when being combined with a program recorded in a computer system in advance, that is, a difference file (a difference program).

The entire disclosure of Japanese Patent Application No. 2016-091487, filed Apr. 28, 2016 is expressly incorporated by reference herein.

What is claimed is:

1. A device for a robot,
wherein a first signal is transmitted from a robot control device to the robot, a second signal is transmitted from the robot control device to the device for a robot, and a third signal is transmitted from the robot control device to the device for a robot, the third signal is transmitted from the robot control device when a communication error between the robot control device and the device for a robot occurs so that the device for a robot is restarted via a reset circuit,
wherein the device for a robot is restarted via the reset circuit when the device for a robot receives the third signal which is a low-level signal continuing for a first period, and
the first period has a 9×n-bit length, and where n is a real number greater than 1.

2. The device for a robot according to claim 1,
wherein the second signal is a signal other than a command signal for restarting the device for a robot, which is one of command signals to the device for a robot.

3. The device for a robot according to claim 1,
wherein the robot control device transmits the third signal to the device for a robot at a transmission speed of 1/n.

4. The device for a robot according to claim 1,
wherein the robot control device and the device for a robot communicate with each other through serial communication.

5. The device for a robot according to claim 1,
wherein the robot control device and the device for a robot are connected to each other via any of RS-422, RS-232C, and RS-485.

6. The device for a robot according to claim 1,
wherein the robot control device consecutively transmits the second signal to the device for a robot a predetermined number of times and the robot control device transmits the third signal when receiving no response signal with respect to the second signal.

7. The device for a robot according to claim 1,
wherein the device for a robot is a force sensor.

8. A robot control device which controls the robot provided with the device for a robot according to claim 1.

9. A robot control device which controls the robot provided with the device for a robot according to claim 2.

10. A robot control device which controls the robot provided with the device for a robot according to claim 5.

11. A robot control device which controls the robot provided with the device for a robot according to claim 3.

12. A robot control device which controls the robot provided with the device for a robot according to claim 4.

13. A robot system comprising:
the robot provided with the device for a robot according to claim 1; and
a robot control device that controls the robot.

14. A robot system comprising:
the robot provided with the device for a robot according to claim 2; and
a robot control device that controls the robot.

15. A robot system comprising:
the robot provided with the device for a robot according to claim 4; and
a robot control device that controls the robot.

16. A robot system comprising:
the robot provided with the device for a robot according to claim 5; and
a robot control device that controls the robot.

17. A robot system comprising:
the robot provided with the device for a robot according to claim 3; and
a robot control device that controls the robot.

18. A device fora robot,
wherein a first signal is transmitted from a robot control device to the robot, a second signal is transmitted from the robot control device to the device for a robot, and a third signal is transmitted from the robot control device to the device for a robot, the third signal is transmitted from the robot control device when a communication error between the robot control device and the device for a robot occurs so that the device for a robot is restarted via a reset circuit, and wherein the robot control device transmits the third signal which is a low-level signal continuing for a period having a 9×n-bit length at a transmission speed of 1/n, and where n is a real number greater than 1.

19. A device fora robot, wherein a first signal is transmitted from a robot control device to the robot, a second signal is transmitted from the robot control device to the device for a robot, and a third signal is transmitted from the robot control device to the device for a robot, the third signal is transmitted from the robot control device when a communication error between the robot control device and the device for a robot occurs so that the device for a robot is restarted via a reset circuit, and wherein the robot control device consecutively transmits the second signal to the device for a robot a predetermined number of times and the robot control device transmits the third signal when receiving no response signal with respect to the second signal.

\* \* \* \* \*